Jan. 18, 1966 F. W. MOORE 3,229,807
MECHANICAL LINKAGE
Filed May 31, 1963 5 Sheets-Sheet 1
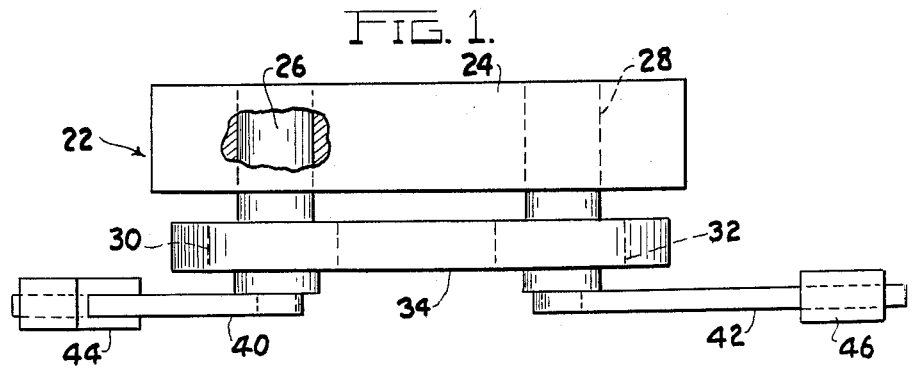
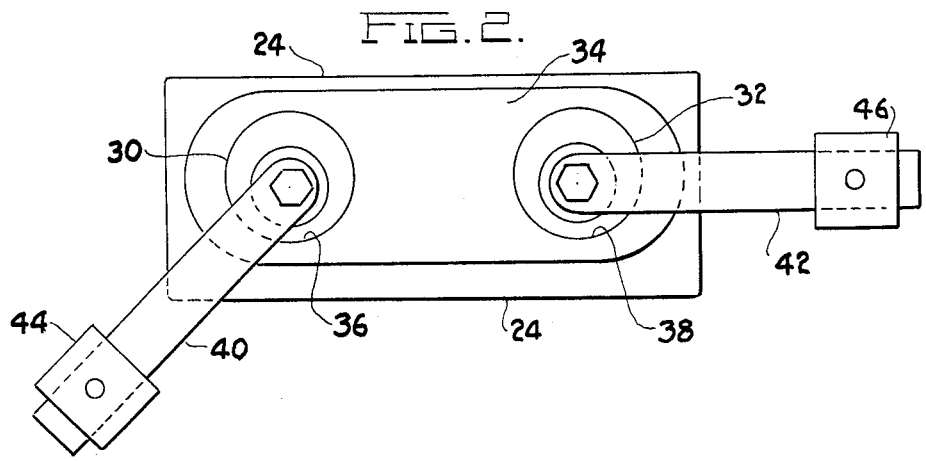
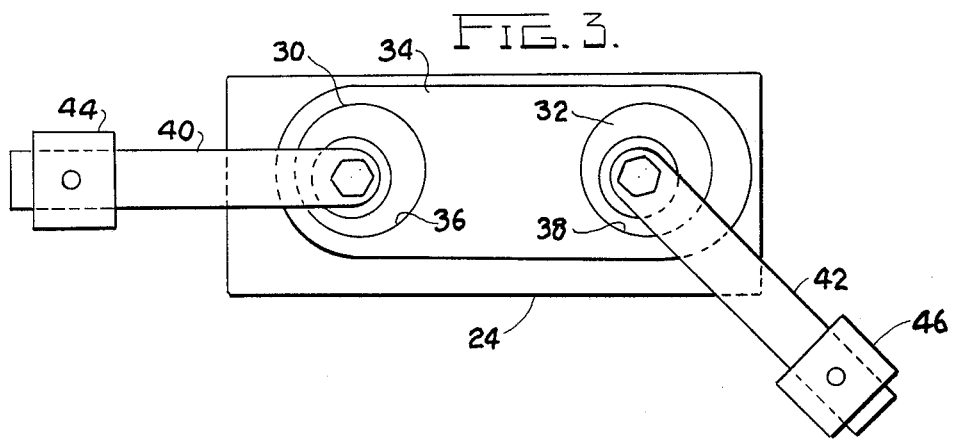
INVENTOR.
Francis W. Moore
ATTORNEYS Jan. 18, 1966 F. W. MOORE 3,229,807
MECHANICAL LINKAGE
Filed May 31, 1963 5 Sheets-Sheet 2

INVENTOR.
Francis W. Moore
BY
ATTORNEYS

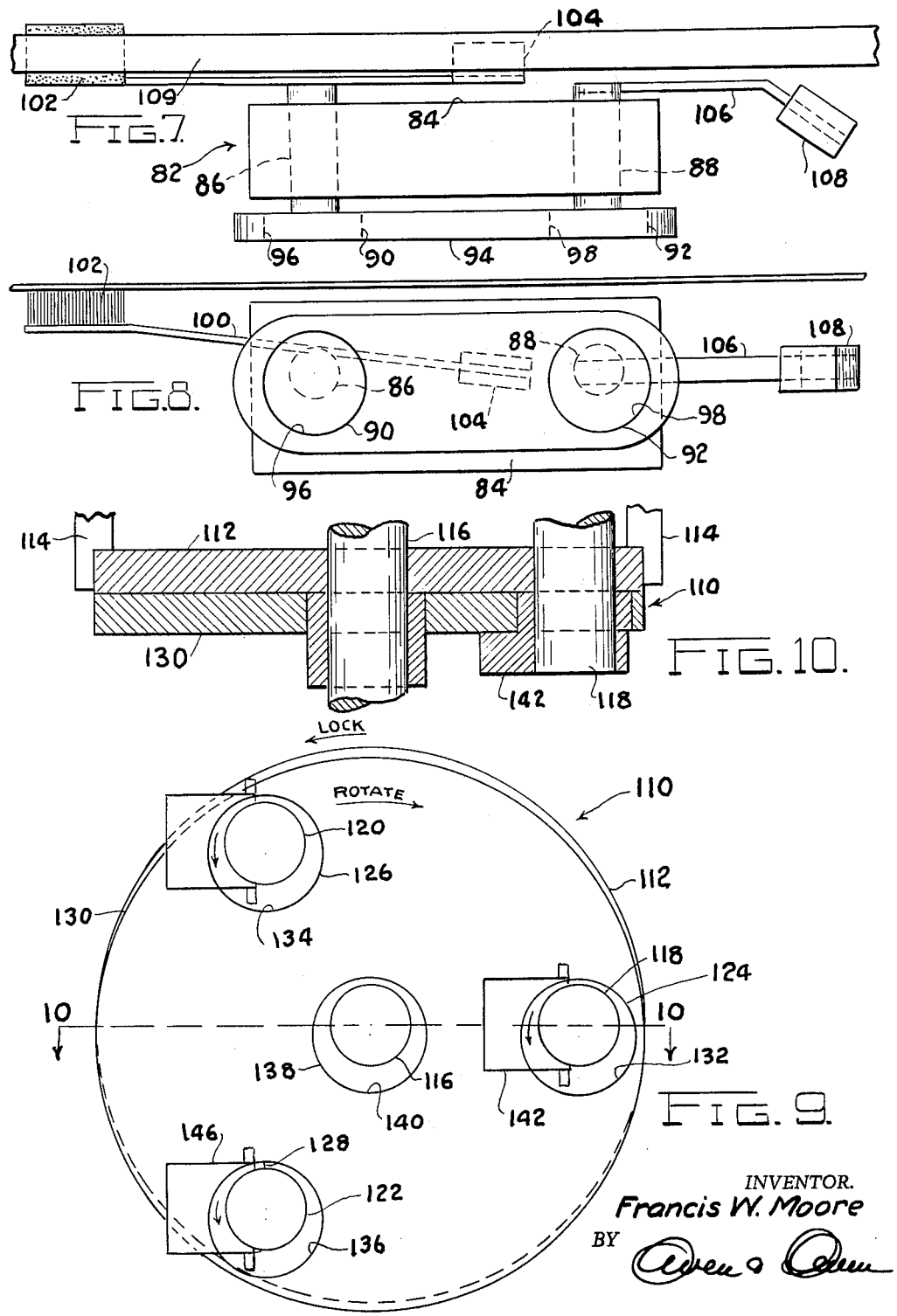

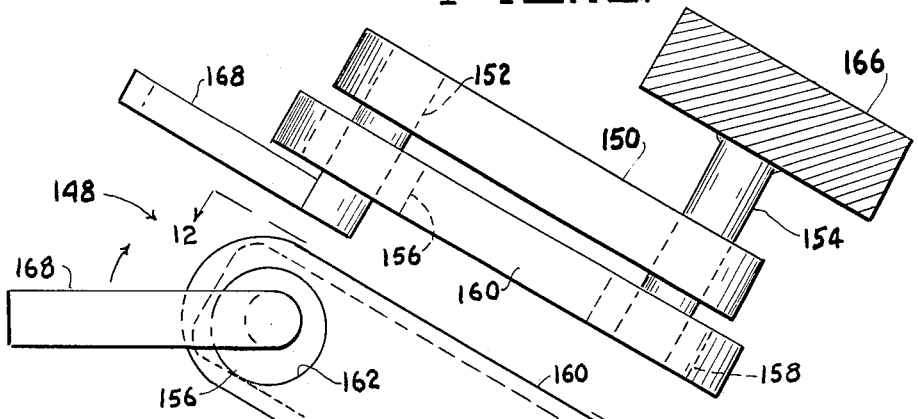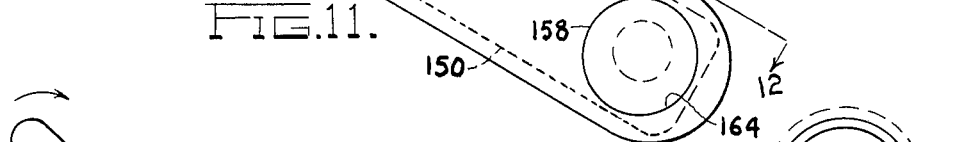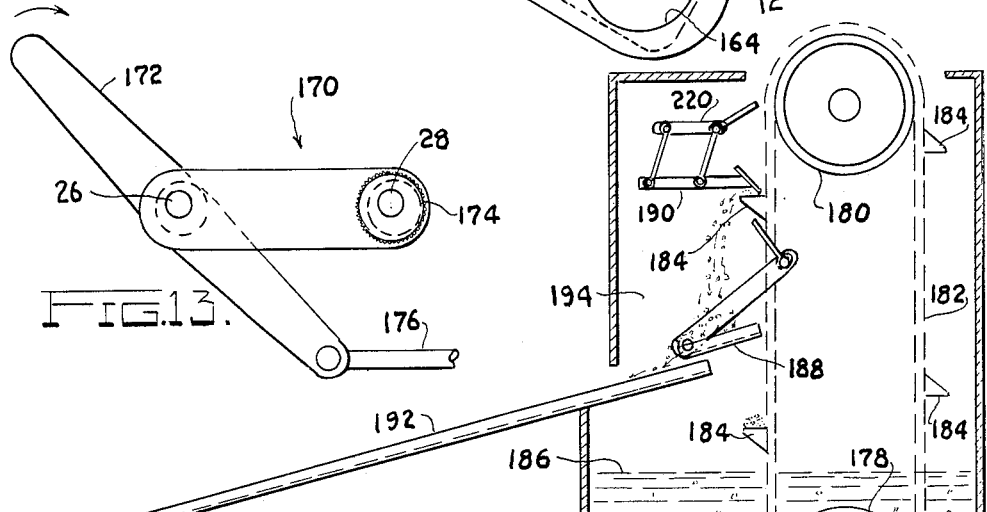

Jan. 18, 1966    F. W. MOORE    3,229,807
MECHANICAL LINKAGE
Filed May 31, 1963    5 Sheets-Sheet 5
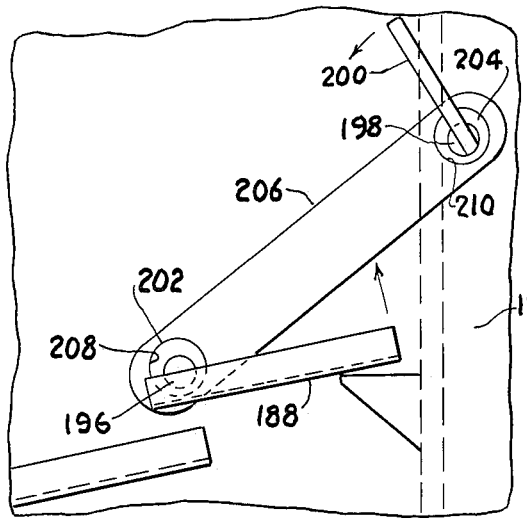
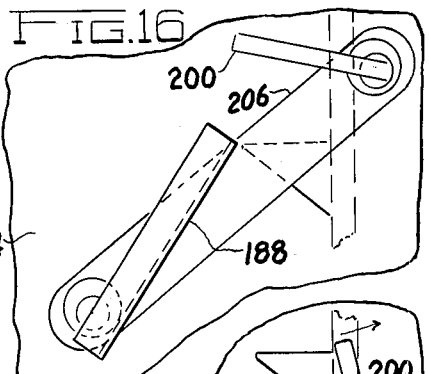
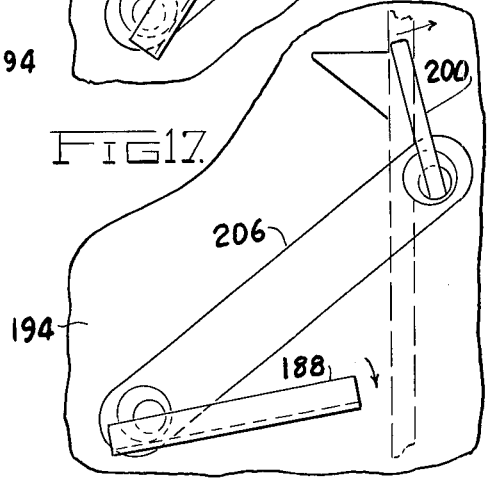
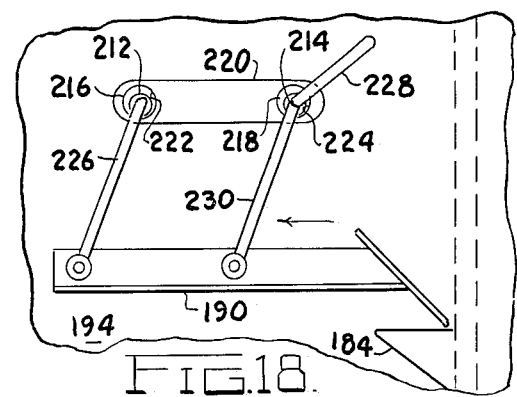
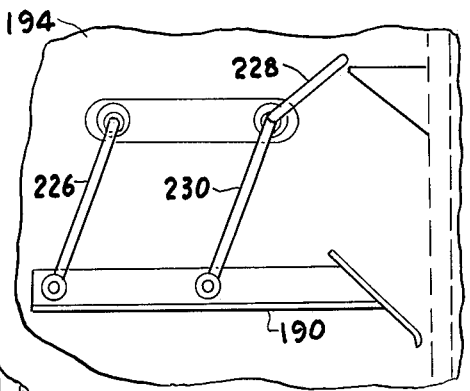
INVENTOR.
Francis W. Moore
BY
ATTORNEYS

United States Patent Office 3,229,807
Patented Jan. 18, 1966

3,229,807
MECHANICAL LINKAGE
Francis W. Moore, 55 Heilman St., Tiffin, Ohio
Filed May 31, 1963, Ser. No. 284,427
10 Claims. (Cl. 198—229)

This invention relates to a mechanical linkage and more particularly to a cam-link mechanism for causing two spaced, rotatable elements to rotate together through substantially equal arcs.

A mechanical linkage according to the invention basically includes at least two cam members connected by a rigid link so that movement can only occur if both cam members move substantially equal amounts in the same direction. Thus, the movement of one cam member can be controlled by the other. In addition, the linkage provides a unique locking arrangement wherein an object connected to one of the cam members can be locked in a given position which is determined by the position of the other cam member, with locking in an infinite number of positions in a 360° circle being possible. There is no limit to the spacing between the two cam members as long as the link between them is sufficiently rigid to prevent one of the cam members from moving relative to the other one.

The applications of the new mechanical linkage are substantially unlimited with several examples of applications being described subsequently. It has been discovered, however, that the linkage has particularly useful applications in combination with a conveyor and an element which is to be moved into and out of the path of members carried by the conveyor. Each conveyor member is moved with the conveyor in a predetermined path and engages the element to move it out of the path; subsequently, when past the element, the member engages an arm which moves the element back into the path to be in position for the next conveyor member. The element and the arm in this instance are connected by two cam members and a link so as to move together.

It is, therefore, a principal object of the invention to provide a mechanical linkage for enabling two spaced, rotatable objects to move together in equal amounts in the same direction.

Another object of the invention is to provide a mechanical linkage which enables an object to be locked in a predetermined position as determined by a remotely positioned control member.

Still another object of the invention is to provide a mechanical linkage for use with a conveyor for moving an element back into a path of a conveyor member after being removed from the path by engagement with a conveyor member.

Other objects and advantages of the invention will be apparent from the following detailed description of preferred embodiments thereof, reference being made to the accompanying drawings, in which:

FIG. 1 is a top view, with parts broken away and with parts in cross section, of a mechanical linkage embodying the invention;

FIG. 2 is a front view of the linkage of FIG. 1;

FIG. 3 is a front view of the same linkage, but with cam members and arms thereof in different positions, having been rotated in a clockwise direction about 45°;

FIG. 7 is a plan view of mechanical linkage similar to that of FIGS. 1–3 used in a specific application;

FIG. 8 is a front view in elevation of the linkage of FIG. 7;

FIG. 9 is a front view in elevation of a modified mechanical linkage embodying the invention;

FIG. 10 is a top view of the linkage of FIG. 9;

FIG. 11 is a front view of a modified mechanical linkage embodying the invention, this linkage being somewhat similar to the linkage of FIGS. 9 and 10;

FIG. 12 is a view taken along the line 12—12 of FIG. 11;

FIG. 13 is a somewhat schematic view in elevation of a brake lever application for a mechanical linkage of the invention;

FIG. 14 is a somewhat schematic view in vertical cross section of a conveyor in combination with two mechanical linkages embodying the invention;

FIG. 15 is a somewhat schematic side view in elevation, on an enlarged scale, of one mechanical linkage application of FIG. 14;

FIG. 16 is a view similar to FIG. 15 but showing a conveyor member in an advanced position;

FIG. 17 is a view similar to FIG. 15 but showing the conveyor member in a still further advanced position;

FIG. 18 is a side view in elevation, on an enlarged scale, of a second mechanical linkage application of FIG. 14;

FIG. 19 is a view similar to FIG. 18 but showing a conveyor member in an advanced position; and FIG. 20 is a view similar to FIG. 18 but showing the conveyor in a still further advanced position.

Figure 4:
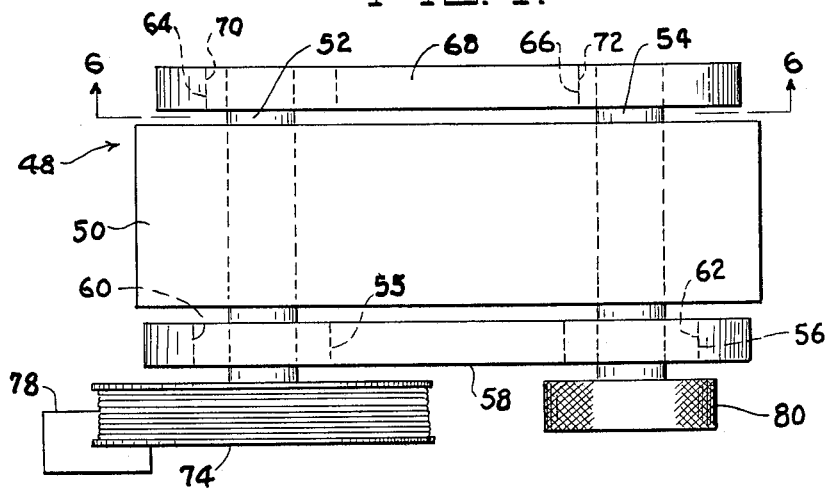
FIG. 4 is a top view of a slightly modified mechanical linkage embodying the invention, employing two cam links rather than one.

Referring to the drawings, and particularly to FIGS. 1 and 2, a mechanical linkage embodying the invention is indicated at 22 and includes a main block 24 which constitutes means for rotatably supporting in spaced relationship two axles 26 and 28. The distance between the axles is substantially unlimited as long as this distance remains fixed. The block 24 is shown for purposes of illustration only and any means can be used to rotatably support the axles 26 and 28. Separate blocks can also be used for each axle if their relationship remains fixed.

Mounted on the axles 26 and 28 are cam members 30 and 32 which can be affixed to the axles in any suitable manner so that the cam members can rotate relative to the block 24. Both of the cam members 30 and 32 are preferably of the same size and shape and are located in corresponding positions with respect to their axles. The cam members are connected by a rigid link 34 having openings 36 and 38 which receive the cam members 30 and 32 in closely fitting, rotatable relationship.

The elements described to this point constitute the basic mechanical linkage of the invention with the applications for which the linkage can be employed being widely varied. It may be noted that neither of the cam members can be turned independently of the other one as long as their axes of rotation remain fixed, and as long as the link 34 remains rigid. Hence, the position of either of the cam members 30 and 32 can be used to control the other. Further, either cam member can be held in any fixed position by maintaining the other cam member stationary.

For purposes of explanation, the cam linkage 22 of FIGS. 1–3 is shown with arms 40 and 42 and weights 44 and 46 connected to the axles 26 and 28. If the cam members 30 and 32 are rotatably mounted on the axles 26 and 28, the arms 40 and 42 can then be connected directly to the cam members 30 and 32, it being only important that the arms 40 and 42 cannot rotate relative to the cam members 30 and 32. The arm 40 in this instance can constitute a control arm and be used to control the position of the arm 42, which can constitute an operating arm. For movement, both of the arms 40 and 42 must move in the same direction through equal arcs. If the arm 40 is moved upwardly in a clockwise direction, the arm 42 will drop downwardly an equal distance, also in a clockwise direction, because of the weight 46. The same operation results if the arm 42 is moved upwardly. However, downward pressure by an operator on either of the arms 40 or 42 will not cause the other one to rise unless the cam members are offset a substantial distance with respect to their axles. For example, in one specific application, with the center of the cam members offset one-eighth inch from the centers of the axles or their axes of rotation, substantially no amount of pressure on one of the arms 40 and 42 may be sufficient to raise the other one. On the other hand, if the offsets of the centers and axes are more than about one-quarter inch, then one of the arms may be used to move the other one. The positions of the cams also affects this relationship of the arms. The extents of the offsets, of course, will vary for any application and the immediately preceding discussion is intended only to show that such movement can or cannot be effected simply by the amount of offset or eccentricity. With a small amount of offset, the arm 42 can be locked in any position once moved to that position by moving both of the arms 40 and 42. Afterward, substantially no amount of downward force acting on the arm 40 alone will move it.

FIG. 3 shows the linkage 22 with the arms 40 and 42 rotated about 45° in a clockwise direction to illustrate how the cam members 30 and 32 also rotate about their axes. This movement also causes the link 34 to move relative to the supporting block 24.

When the centers of the cam members 30 and 32 are aligned with their axes of rotation so that all four lie in a single line, the control of one of the cam members relative to the other is at a minimum. This apparently is true because the movement of the link 34 is least affected in this position with the result that if even one of the cam members is held stationary, the other can rotate slightly unless extremely close tolerances are established for the cam members 30 and 32 and the openings 36 and 38 in the link 34. This condition of minimum control is established at 180° opposite positions and is reached twice for each 360° rotation of the arms 40 and 42. Where the linkage is only to be used for limited movements, this condition is immaterial. However, where larger movements, particularly of 180° or more, are to be encountered, then a mechanical linkage device 48 of FIGS. 4-6 can be employed. The linkage 48 is similar to that of FIGS. 1-3 except that two sets of cam members and two links are employed. The cams of each set are positioned 90° from the other set of cams so that when one set is in the aligned position with the centers of the cam members aligned with the axes of rotation, the other set will be disposed 90° therefrom so that lines through their centers and axes will be parallel, similar to the position of the cam members 30 and 32 of FIG. 2.

The linkage 48 includes a main block 50 for rotatably holding and supporting axles 52 and 54 and cam members 55 and 56. A first cam link 58 has openings 60 and 62 to receive the cam members in the same manner as the link 34. In addition, a second set of cam members 64 and 66 are also located on the axles 52 and 54, on the side of the block opposite the cam members 55 and 56, in this instance. A second cam link 68 has openings 70 and 72 for the cam members 64 and 66 in the same manner as the link 34.

Figure 6:
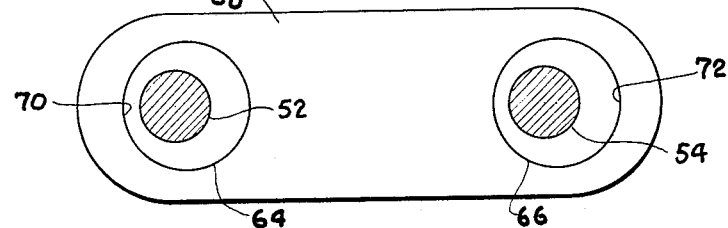
FIG. 6 is a view in elevation taken along the line 6—6 of FIG. 4.
Figure 5:
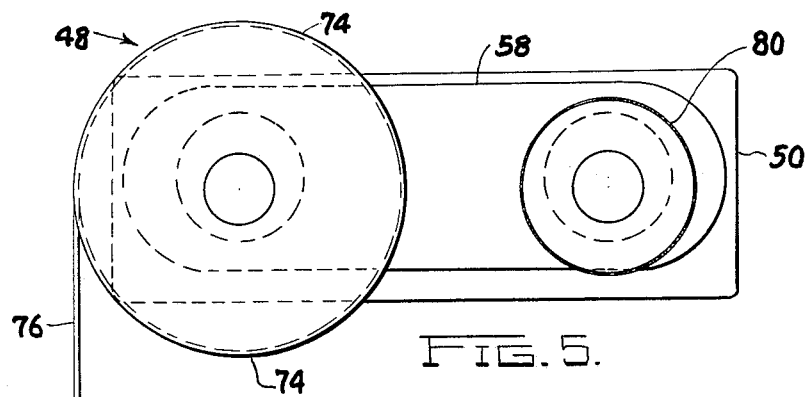
FIG. 5 is a front view of the mechanical linkage of FIG. 4.

As shown in FIGS. 5 and 6, the first set of cam members 55 and 56 have lines extending through their centers and the axes of rotation displaced 90° from lines through the centers of the cam members 64 and 66 and their axes of rotation. In this manner, when one set of cam members are in their positions of minimum control, the other set of cam members will be effective to maintain control. Hence, accurate control and positioning can be attained for all positions of the axles 52 and 54.

In this instance, for purposes of illustration and explanation, a drum 74 is mounted on and affixed to the axle 52 with a cable 76 wound around the drum and connected to a weight 78. A control knob 80 is mounted on and affixed to the other axle 54 and rotates therewith. The drum 74 can be rotated any amount to raise or lower the weight 78 to any desired position simply by rotating the knob 80 as the drum 74 is rotated. If it is desired to lower the weight 78 this can be accomplished simply by rotating the knob 80 in a counterclockwise direction in this instance with the weight then moving downwardly accordingly. If it is desired to raise the weight 78, however, both the drum 74 and the knob 80 must be rotated in clockwise directions. If the distance between the centers of the cam members and the axes of rotation is small, the drum 74 will stay in a fixed position regardless of the amount of the weight 78.

FIGS. 7 and 8 illustrate another possible application of the invention for the purpose of illustrating the versatility of the mechanical linkage embodying the invention. In this instance, it is desired to maintain a brush in contact with and under pressure against a conveyor belt and to move the brush slowly toward the belt as the brush wears, while preventing opposite movement of the brush. For this purpose, a mechanical linkage embodying the invention is shown at 82 and includes a main supporting block 84 for rotatably supporting axles 86 and 88. Cam members 90 and 92 are mounted on the axles 86 and 88 and are connected by a link 94, being received in openings 96 and 98. A brush lever arm 100 is fastened to the axle 86 for pivotal movement, with a brush 102 located at one end of the lever arm 100 and a weight 104 at the other end. An arm 106 with a counterweight 108 is attached to the control axle 88, on the same side of the main block 84 as the lever arm 100, in this instance. The brush 102 is maintained in contact with a belt 109 which, in this instance, is the lower or return run of a conveyor belt, the brush 102 being urged against the belt 109 by the weight 104. As the brush 102 wears, the weight 104 moves downwardly to move the brush up against the belt 109, thereby moving the cam member 90 in a clockwise direction, with the cam member 92 moving in a similar direction because of the counterweight 108. However, it is impossible for the brush 102 to move in the opposite direction because it would require counter-rotation of the cam member 90 and similar rotation of the cam member 92. This would mean that the weight 108 would have to rise, which is impossible if the eccentricity of the cam members remains small. If the eccentricity is increased, some movement of the weight can be effected, which may be desirable for some applications.

FIGS. 9 and 10 show an additional embodiment of the invention used in combination with a drum to enable one-way rotation of the drum and prevent rotation in the opposite direction. A mechanical linkage 110 in this instance includes a main block 112 which is of circular configuration and constitutes an end of a drum 114. The drum is supported on and rotated by a main drive shaft 116 to which the circular block or drum end 112 is affixed. The block 112 also holds three axles 118, 120, and 122 on which are mounted cam members 124, 126, and 128. A circular cam link 130 has openings 132, 134, and 136 which receive the cam members 124, 126, and 128. The cam link 130, in this instance, is rotatably and eccentrically mounted with respect to the drive shaft 116 by means of a cam member 138 received in a center opening 140. Suitable counterweights 142, 144, and 146 are mounted on the axles 118, 120, and 122 and cannot rotate relative to the cam members 124, 126, and 128.

With the instant arrangement, the drum 114 can rotate in a clockwise direction but cannot be rotated in a counterclockwise direction. During the clockwise rotation, the cam link 130 also rotates and the cam members 124, 126, and 128 move in a circular path around the central or control cam member 138. The outer cam members maintain a constant relationship with respect to the center cam member throughout their rotation, which is made possible by the counterweights 142, 144, and 146. If an attempt is made to rotate the drum 114 in the opposite direction, however, the counterweights will prevent the cam members 124, 126, and 128 from rotating in the opposite direction relative to the link 130 to maintain the same relationship with respect to the center cam member 138. Hence, such movement will be prevented.

The counterweights 142, 144, and 146 can be pivotally mounted on the axles 118, 120, and 122 so that they can be swung to the opposite position, extending on the opposite sides of the cam members to enable reverse rotation to take place. While the three cam members 124, 126, and 128 are shown, fewer or even more may be used as desired. The counterweights can be affixed to the cam members rather than to the axles, if desired, and this is particularly true if the axles are maintained in fixed relationship with respect to the drum end or the block 112 so that the counterweights rotate relative to the axles.

Referring to FIGS. 11 and 12, another modified mechanical linkage 148 includes a main supporting block or bar 150. Axles 152 and 154 are rotatably supported by the bar 150 with cam members 156 and 158 affixed to the axles. A connecting link 160 has openings 162 and 164 to receive the cam members 156 and 158 in the usual manner. The axle 154 is held in nonrotatable relationship by means of a body 166 and both the bar 150 and the link 160 rotate around the shaft 154. A load arm 168 is affixed to the axle 152 and always remains at a given angle as the link 160 rotates and the cam member 156 maintains a given relationship with respect to the cam member 158. The link 160 and the arm 168 can be locked in any position or, for example, if the arm 168 is weighted, the link 160 can be made to rotate only in a clockwise direction as shown.

FIG. 13 shows a brake lever or the like utilizing the mechanical linkage according to the invention. In this instance, a mechanical linkage indicated at 170 can be the same as that of FIGS. 1–3 and will not be discussed in detail. In this instance, a brake lever 172 is affixed to the axle 26 and a knob 174 is affixed to the axle 28. The lever 172 is connected to the brakes or to a load through a bar or rod 176 to which it is pivotally connected. As the lever 172 is pulled, to set the brakes, for example, the knob 174 is rotated in a clockwise direction. The lever will then stay in the particular position in which it is located to provide an infinite adjustment of pressure or movement.

Two unique and highly advantageous applications for the mechanical linkage of the invention are shown in connection with a conveyor system in FIG. 14. The specific conveying system shown is designed for a sewerage system with the conveyor itself including two pulleys 178 and 180 carrying a suitable chain or webbing 182 upon which are mounted a plurality of conveyor elements or rakes 184. The rakes pass through a pool 186 of water containing solids and remove the solids from the water. The rakes 184 then move upwardly past a pivoted deflector plate 188 and a wiper 190 which moves across the rakes and clears them of the solid material carried thereon. The solid material falls onto the deflector plate 188 and from there onto a discharge chute 192 from which the material is suitably removed.

The deflector plate 188 must move out of the way when engaged by the rakes 184 and then back into position before the rakes contact the wiper 190 so as to be in a position to receive the solid material. While the deflector plate 188 can be swung out of the way easily when contacted by the rake 184, once the rake passes, the deflector plate will fall back into place with a loud clatter which is intolerable, particularly when a number of the sewerage installations are employed in one large space or room. While a number of methods have been employed to lower the deflector plate 188 into place, they have generally been less than satisfactory.

The application of the mechanical linkage embodying the invention to the deflector plate is shown more specifically in FIGS. 15–17. Accordingly, a rear plate or frame member 194 constitutes a main block for rotatably supporting an axle 196 for the deflector plate 188 and also a control axle 198 for a return arm 200. Cam members 202 and 204 are carried by the axles 196 and 198 and a cam link 206 connects the cam members which are received in openings 208 and 210. It will thus be seen that the mechanical linkages of FIGS. 15–17 is similar to that of FIGS. 1–3 except that the deflector plate 188 and the return arm 200 are mounted for movement toward one another and away from one another.

When the conveyor element or rake 184 moves upwardly, it engages the deflector plate 188 and swings it out of the path of the rakes, at the same time rotating the cam member 202 and the axle 196 in a counterclockwise direction. Because the lever arm 200 is acted upon by gravity, it moves downwardly in a counterclockwise direction along with the cam member 204 and the axle 198 until the position of FIG. 16 is reached. At this point, the return arm 200 is in the path of the rake 184 and the deflector plate 188 is open and out of the path of the rake 184. The rake then engages the return arm 200 and moves the axle 198 and cam member 204 in a clockwise direction. Because the deflector plate 188 is now acting under the influence of gravity, it moves downwardly in a clockwise direction until the position of FIG. 15 is again reached with the return arm 200 again out of the path of the rake 184. Because the return arm is moved slowly by the rake, it likewise slowly closes the deflector plate 188. A quiet, efficient and substantially maintenance-free operation is thereby attained with the mechanical linkage acording to the invention.

FIGS. 18–20 show the mechanical linkage of the invention embodied with the wiper 190. The frame member or plate 194 again serves as a main block for rotatably supporting axles 212 and 214 which carry cam members 216 and 218. A rigid link 220 connects the cam members 212 and 214, receiving them in openings 222 and 224. An operating arm 226 is affixed to the axle 212 and is pivotally connected to the rear portion of the wiper 190. A return arm 228 is affixed to the front axle 214 and moves therewith. A supporting link 230, parallel to the arm 226 is pivotally connected to both the wiper 190 and the axle 214; the link 230 serves to support the wiper 190 and move it in a parallel path but does not help to operate the wiper.

When the rake 184 contacts the wiper 190, it pushes it toward the left and causes the wiper to move across the teeth of the rake 184, thereby wiping it free of solids which fall onto the deflector plate 188, which is now closed. As the wiper 190 moves toward the left, it moves the axle 212 and the cam member 216 in a clockwise direction. Because the return arm 228 is acted upon by gravity, the cam member 218 moves in a clockwise direction and the arm 228 moves downwardly. This continues until the wiper 190 is out of the path of the rake 184 as shown in FIG. 19, at which time the return arm 228 is moved into the path of the wiper 190. Upon continued upward movement of the rake 184, it engages the return arm 228 and moves it upwardly, thereby moving the cam member 218 and the axle 214 in a counterclockwise direction. Because the arm 226 is acted upon by gravity, the cam member 216 and the axle 212 also move in a counterclockwise direction to return the wiper 190 to its original position in the path of the next rake 184, as shown in FIG. 20. Again the mechanical linkage embodying the invention provides smoothly operating, trouble-free movement and operation of the wiper 190.

Various modifications and applications of the above described embodiments of the invention will be apparent to those skilled in the art, and it is to be clearly understood that such modifications can be made without departing from the scope of the invention, if they are within the spirit and the tenor of the accompanying claims.

I claim:

1. In combination, a lever, mechanism for locking the lever in any of an infinite number of positions in a given arcuate path, said mechanism comprising a pivot axle rotatably supporting said lever, a second axle spaced from said pivot axle, means rotatably supporting said axles at a predetermined distance, a cam member on each of said axles with the cam member on said pivot axle being rotatable with said lever, a link having two openings receiving said cam members in closely fitting, rotatable relationship, and means for enabling manual rotation of the other cam member relative to said link, the eccentricity of said cam members being sufficiently small that both said lever and said manual rotation means must be moved in a common direction to enable movement of said lever.

2. In combination, a drum, mechanism for enabling rotation of the drum in one direction but preventing rotation of the drum in the opposite direction in any of an infinite number of positions, said mechanism including a drum axle rotatable with said drum, an end plate mounted on said axle and connected to said drum, a second axle rotatably supported by said end plate in fixed, parallel relationship with respect to said drum axle, a cam member on each of said axles, a link plate connecting said cam members in rotatable relationship, and means for urging the cam member on the second axle in a predetermined direction.

3. In combination with a conveyor including a movable member and conveyor means for moving said member along a predetermined path, an element having two positions, a first position being in the path of said member and a second position being out of the path of said member, said element being movable from said first position to said second position when engaged by said member as said member is moved along said path, an arm having two positions, a first position being in the path of said member and a second position being out of the path of said member, a first axle connected to said element, a second axle connected to said arm, means for rotatably supporting said axles in fixed, spaced relationship, a cam member on each of said axles and rotatable therewith, a link having two openings receiving said cam members in closely fitting, rotatable relationship, whereby said axles rotate together and move said element from its second position to its first position when said arm is moved from its first position to its second position, and move said arm from its second position to its first position when said element is moved from its first position to its second position.

4. In combination with a conveyor including a movable member and conveyor means for moving said member along a predetermined path, an element having two positions, a first position being in the path of said member and a second position being out of the path of said member, said element being movable from said first position to said second position when engaged by said member as said member is moved along said path, an arm having two positions, a first position being in the path of said member and a second position being out of the path of said member, two cam members rotatable on parallel axes spaced apart a predetermined distance, one cam member being rotatable with said element, and the other cam member being rotatable with said arm, a link connecting said cam members in rotatable relationship with respect to said link, whereby said axles rotate together and move said element from its second position to its first position when said arm is moved from its first position to its second position, and move said arm from its second position to its first position when said element is moved from its first position to its second position.

5. In a sewerage system including wall means forming a receptacle for a pool of liquid, a vertical, endless conveyor, the lower end of which is disposed in said pool, a plurality of rake members movable with said conveyor in a vertical path, a deflector plate having two positions, a first position being in the path of said rake members and a second position being out of the path of said rake members, a first axle for rotatably supporting said deflector plate, an arm above said deflector plate and having two positions, a first position being in the path of said rake members and a second position being out of the path of said rake members, a second axle rotatably supporting said arm, a first cam member on said first axle and rotatable with said deflector plate, a second cam member on said second axle and rotatable with said arm, a link having two openings receiving said cam members in closely fitting, rotatable relationship, whereby said cam members rotate together and move said arm from its second position to its first position when said deflector plate is moved from its first position to its second position, and move said deflector plate from its second position to its first position when said arm is moved from its first position to its second position.

6. In a sewerage system including wall means forming a receptacle for a pool of liquid, a vertical, endless conveyor, the lower end of which is disposed in said pool, a plurality of rake members movable with said conveyor in a vertical path, a wiper having two positions, a first position being in the path of said rake members and a second position being out of the path of said rake members, parallel link means including a pair of axles and at least one connecting link rotatable with one of said axles for movably supporting said wiper between its two positions, an arm having two positions, a first position being in the path of said rake members and a second position being out of the path of said rake members, said arm being supported by the other of said axles, a cam member on each of said axles and rotatable therewith, a cam link having two openings receiving said cam members in closely fitting, rotatable relationship whereby said cam members rotate together and move said arm from its second position to its first position when said wiper is moved from its first position to its second position, and said wiper is moved from its second position to its first position when said arm is moved from its first position to its second position.

7. In a sewage system including wall means forming a receptacle for a pool of liquid, a vertical, endless conveyor, the lower end of which is disposed in said pool, a plurality of rake members movable with said conveyor in a vertical path, a deflector plate having two positions, a first position being in the path of said rake members and a second position being out of the path of said rake members, a first axle for rotatably supporting said deflector plate, a first arm above said deflector plate and having two positions, a first position being in the path of said rake members and a second position being out of the path of said rake members, a second axle rotatably supporting said arm, a first cam member on said first axle and rotatable with said deflector plate, a second cam member on said second axle and rotatable with said first arm, a first cam link connecting said cam members in rotatable relationship whereby said cam members rotate together and move said arm from its second position to its first position when said deflector plate is moved from its first position to its second position, and move said deflector plate from its second position to its first position when said arm is moved from its first position to its second position, a wiper above said deflector plate and said first arm and having two positions, a first position being in the path of said rake members and a second position being out of the path of said rake members, parallel link means including a pair of third and fourth axles and at least one connecting link rotatable with one of said pair of axles for movably supporting said wiper between its two positions, a second arm having two positions, a first position being in the path of said rake members and a second position being out of the path of said rake members, said arm being supported by the other of said pair of axles, third and fourth cam members on said pair of axles and rotatable therewith, a second link connecting said cam members in rotatable relationship, whereby said third and fourth cam members rotate together and move said second arm from its second position to its first position when said wiper is moved from its first position to its second position, and said wiper is moved from its second position to its first position when said second arm is moved from its first position to its second position.

8. A cam-link mechanism comprising two axles, a pair of spaced cam members, means rotatably supporting said cam members on said axles spaced apart a fixed, predetermined distance, with the axles and the centers of the associated cam members being spaced apart by small, predetermined, equal distances, a link connecting said cam members in closely fitting, rotatable relationship with respect to said link, a weight rotatable with one of said cam members and producing a force tending to urge the associated cam member in one direction, and controllable means movable with the other cam member and urging said other cam member in a direction opposite to the direction the first cam member is urged by said weight.

9. A cam-link mechanism comprising a pair of spaced, substantially parallel axles, means holding said axles in spaced, parallel, rotatable relationship, a cam member eccentrically positioned on each of said axles with the centers of said cam members being spaced from the axes of the associated axles by small, predetermined, equal amounts, a link having two openings receiving said cam members in closely fitting, rotatable relationship, whereby rotational movement of one of said cam members substantially equals the rotational movement of the other of said cam members, means rotatable with one of said axles and producing a force tending to urge the associated axle and cam member in one direction, and controllable means rotatable with the other of said axles and the other of said cam members and urging the associated axle and cam member in the opposite direction, whereby neither said weight nor said controllable means can be moved in one direction without applying a force to the other of said weight and said controllable means to move it in the same direction.

10. A cam-link mechanism comprising a pair of spaced, substantially parallel axles, means holding said axles in spaced, parallel, rotatable relationship, a cam member eccentrically positioned on each of said axles with the centers of said cam members being spaced from the axes of the associated axles by small, predetermined, equal amounts, a link having two openings receiving said cam members in closely fitting, rotatable relationship, controllable means rotatable with one of said axles and the associated cam member, and means associated with the other axle and cam member for enabling manual rotation of said other axle and cam member relative to said link whereby the movement of said controllable means can be controlled.

References Cited by the Examiner
UNITED STATES PATENTS

| 168,575 | 10/1875 | McCloskey | 74—67 |
| 322,798 | 7/1885 | Cowden | 74—67 |
| 3,069,915 | 12/1962 | Sawle | 74—68 |

SAMUEL F. COLEMAN, *Primary Examiner.*

ERNEST A. FALLER, *Examiner.*